(12) United States Patent
Yu et al.

(10) Patent No.: US 9,414,128 B2
(45) Date of Patent: Aug. 9, 2016

(54) SYSTEM AND METHOD FOR PROVIDING CONTENT-AWARE PERSISTENT ADVERTISEMENTS

(71) Applicants: Lei Yu, Hangzhou (CN); Yangbin Wang, Palo Alto, CA (US)

(72) Inventors: Lei Yu, Hangzhou (CN); Yangbin Wang, Palo Alto, CA (US)

(*) Notice: Subject to any disclaimer, the term of this patent is extended or adjusted under 35 U.S.C. 154(b) by 56 days.

(21) Appl. No.: 14/181,683

(22) Filed: Feb. 16, 2014

(65) Prior Publication Data

US 2015/0237410 A1    Aug. 20, 2015

Related U.S. Application Data

(63) Continuation-in-part of application No. 13/204,860, filed on Aug. 8, 2011, now abandoned.

(51) Int. Cl.
*H04N 7/025* (2006.01)
*H04N 7/10* (2006.01)
*H04N 21/81* (2011.01)
*G06Q 30/02* (2012.01)
*H04N 21/8358* (2011.01)

(52) U.S. Cl.
CPC ......... *H04N 21/812* (2013.01); *G06Q 30/0269* (2013.01); *H04N 21/8358* (2013.01)

(58) Field of Classification Search
USPC ................................. 725/32, 34–35
See application file for complete search history.

(56) References Cited

U.S. PATENT DOCUMENTS

| | | | |
|---|---|---|---|
| 8,009,861 B2 | 8/2011 | Lu et al. | |
| 2007/0253594 A1* | 11/2007 | Lu et al. | 382/100 |
| 2010/0122286 A1* | 5/2010 | Begeja et al. | 725/34 |
| 2010/0131847 A1* | 5/2010 | Sievert et al. | 715/719 |
| 2011/0023060 A1* | 1/2011 | Dmitriev et al. | 725/34 |

* cited by examiner

*Primary Examiner* — Mulugeta Mengesha

(57) ABSTRACT

A method and system of providing content-aware persistent advertisements comprises the steps of ingesting and collecting VDNA (Video DNA) fingerprints of media contents playing on various network-enabled terminals including Internet browsers, mobile devices, tablets, smart televisions and so on; sending the ingested fingerprints along with other information such as metadata, user's location, etc, to the content identification server via Internet or mobile networks, and selecting accurate advertisements according to the media content and relevant information, then finally pushing the advertisements back to user's terminal. With VDNA fingerprint identification, media contents are identified by content instead of metadata or other surrounding information, so that the result of identification can be considered genuine, and the chosen advertisements based on the media content can be persistent across multiple terminals playing the same media content.

19 Claims, 5 Drawing Sheets

SYSTEM AND METHOD FOR PROVIDING CONTENT-AWARE PERSISTENT ADVERTISEMENTS

CROSS-REFERENCE TO RELATED APPLICATIONS

The present application is a Continuation-in-Part of U.S. application Ser. No. 13/204,860, filed on Aug. 8, 2011, entitled "SYSTEM AND METHOD FOR PROVIDING CONTENT-AWARE PERSISTENT ADVERTISEMENTS" and which is incorporated herein by reference and for all purposes.

BACKGROUND OF THE INVENTION

1. Field of the Invention

The present invention, which relates to a method and system for providing content-aware persistent advertisements, comprises the steps of extracting and collecting VDNA (Video DNA) fingerprints of media contents playing on various network-enabled terminals including internet browsers, mobile devices, tablets, smart televisions (TVs) and so on, sending the extracted fingerprints along with other information such as metadata, user's location, etc, to the content identification server via internet or mobile networks, and selecting accurate advertisements according to the media content and relevant information, then finally push the advertisements back to user's terminal. Specifically, the present invention relates to facilitating content-aware persistent advertisements.

2. Description of the Related Art

The internet has become an ongoing emerging source that tends to expand more and more. The growth of this particular media attracts the attention of advertisers as a more productive source to bring in consumers. A clear advantage a consumer has with online advertisements is that he or she has control over the item, choosing whether to check it out or not. Online advertisements also can offer various forms of animation. In its most common use, the term online advertising comprises all sorts of banner advertisement, e-mail advertising, in game advertising, and keyword advertising, on many social network platforms, which have received increased relevance. Web related advertising has a variety of sites to publicize and reach a niche audience to focus its attention to a specific group. Research has proven that online advertising has given results and has growing business revenue.

Deploying online advertisements along with various contents including video, audio, images or texts, is a crucial strategy for content owners to realize monetization on their contents. Online advertisements are seen very often on websites, free applications, online videos, etc. on terminals such as PCs (personal computers), smart TVs, mobile devices or tablets. There are several common ways in which online advertising is purchased: CPM (Cost Per Mile), CPC (Cost Per Click), and CPA (Cost Per Action). Content owners apply these revenue models along with the contents they possess.

Nowadays examples of online advertising include contextual advertising on search engine results pages, banner ads, rich media ads, social network advertising, and so on, wherein contextual can be 1) text context, which is mostly used at present, advertisement engines uses keywords of the contents or the application or websites containing the contents to determine appropriate advertisements, 2) metadata of the content, such as title, author, publish date of contents like videos, albums, 3) location context, some applications or websites are able to acquire users' location information, therefore the advertisements they deploy can be location aware.

Contextual advertising is a form of targeted advertising for advertisements appearing on websites or other media, such as content displayed in mobile browsers. The advertisements themselves are selected and served by automated systems based on the content displayed to the user. A contextual advertising system scans the text of a website for keywords and returns advertisements to the webpage based on what the user is viewing. The advertisements may be displayed on the webpage or as pop-up ads. Contextual advertising is also used by search engines to display advertisements on their search results pages based on the keywords in the user's query. Contextual advertising is a form of targeted advertising in which the content of an ad is in direct correlation to the content of the web page the user is viewing. Contextual advertising is also called "In-Text" advertising or "In-Context" technology. Contextual advertising has made a major impact on earnings of many websites. Because the advertisements are more targeted, they are more likely to be clicked, thus generating revenue for the owner of the website (and the server of the advertisement). There are several advertising agencies that help brands understand how contextual advertising options affect their advertising plans. There are three main components to online advertising:

1) creation—what the advertisement looks like
2) media planning—where the advertisements are to be run
3) media buying—how the advertisements are paid for Contextual advertising replaces the media planning component. Instead of humans choosing placement options, that function is replaced with computers facilitating the placement across thousands of websites.

However, there are some disadvantages on the current methods of contextual advertisements: 1) the context information or the metadata of the content are usually not verified by content owner, they are mostly edited by the website or application which distribute the content, therefore it is possible that the advertisements chosen for the content based on the contextual information are not relevant to the content or not desired by content owners; 2) automatic delivery of content-aware advertisements are not possible; 3) the current method of advertisement distribution does not combine all retrievable information to select most accurate and user prone ads; 4) such methods cannot select accurate advertisements for terminal devices when they are playing contents like videos or audios, because those contents playing on terminal devices, whether they are online or locally saved, provide limited metadata or information. Moreover, the advertisements displaying on different terminal devices are now-independent; it is not possible for content providers or advertising agents to apply proper business rules on those advertisements, wherein the business rules, for example, could be displaying a serial of advertisements for the same media contents playing on different devices. There are not feasible in the current methods of contextual advertisements to determine accurately the media contents showing on the screens of different devices and to select proper advertisements according to predefined business rules.

Ways to automatically identify the contents which users are watching on various terminals, and choose accurate online advertisements are hence desirable, so that no or few human operations are involved in the whole process. With the help of a mature media fingerprinting technology, given required content and metadata from content owners and users, the system is able to identify any number or format of media contents, and push the most accurate advertisements which content owners and users desire.

All these and other introductions of the present invention will become much clear when the drawings as well as the detailed descriptions are taken into consideration.

SUMMARY OF THE INVENTION

An object of the present invention is to overcome at least some of the drawbacks relating to the prior arts as mentioned above.

Conventional deployment of online content accompanied advertisements is based on textual context of the metadata from the displaying content. Such metadata information is usually not verified by the content owner; they are mostly edited by the website or application which distributes the content, so that it is not possible for content owners and advertisement agents to deploy content-aware persistent advertisements across different terminals and platforms. However in the present invention, the content-aware persistent advertisement system is facilitated with media content identification sub-system, which enables swift and automatic online media identification and advertisement selection.

An object of the present invention is to automatically identify media contents playing on various devices and push relevant advertisements according to the content and other information, such as a user's location, in a fast and accurate way. The present invention comprises steps of extracting and collecting VDNA fingerprints of media contents playing on various network-enabled terminals including internet browsers, mobile devices, tablets, smart TVs and so on, sending the extracted fingerprints along with other information such as metadata, user's location, etc, to the content identification server via internet or mobile networks, and selecting accurate advertisements according to the media content and relevant information, then finally push the advertisements back to the user's terminal.

Extracting and collecting fingerprints out from media contents on devices takes advantage of the rapidly increasing processing speed of the mobile devices nowadays to extract characteristic values of each frame of image and audio from media contents, as is called "VDNA (Video DNA)", which are registered in VDDB (Video Digital Data-Base) for reference and query. Such process is similar to collecting and recording human fingerprints. One of the remarkable uses of VDNA technology is to rapidly and accurately identify media contents, so that it is possible to select and push relevant advertisements in mobile networks.

Another characteristic of VDNA fingerprints is that it is very compact, so that it is feasible to transfer over mobile networks. Because some terminals may use mobile networks, which always have lower bandwidth, sending huge amounts of information of the media content to the content provide for identification is not realistic, while sending only metadata of the media content may not result in accurate selection of advertisements. Therefore extracting key characteristics of the media contents and sending the extracted fingerprints of the media contents remits the mentioned disadvantages.

The VDNA fingerprint process is performed on terminals where media contents are playing on, therefore additional software components are required to install on these terminals such as plug-ins for internet browsers, dedicated APIs (application program interface) for mobile devices and tablets or interfaces designed for smart TVs. These software components help to collect fingerprints of the on play media contents as well as other metadata information and user specific data. Such data will be sent via internet or mobile networks to content identification server, where the media content can be identified.

Advertisement selection is based on the identified contents; therefore, media contents showing on different terminals are able to trigger persistent advertisements or sets of relevant advertisements predefined by content providers and ad agents under specific business rules. Users who use the media contents have the options to choose what kinds of user specific data to share. Advertisement selection also takes these user specific data into account to generate advertisements most suitable for users. Content provides and advertisement agents will predefine some business rules for the choice of advertisements. These rules are crucial for generating content-aware persistent advertisements. The terminology of content-aware persistent advertisement is self-explanatory, whereas content-aware means that the advertisement is selected according to the recognition result of the media content, which comes along from the content identification center. In addition, the advertisements are also persistent, whereas persistency can have multiple forms, such as:

1) geo-location persistency, meaning that for users with terminal devices in a same range of locations, they should be assigned with advertisements with specific location hints or information, for example promotion of the nearest products which appears in the recognized media content.
2) time persistency, meaning users with terminal devices in the same duration of time, they should be assigned with advertisements with specific date or time hints or information. For example, products on sale on a specific date of a week.
3) environment persistency, meaning that for users with terminal devices in the same environment, they should be assigned with advertisements with specific environmental hints or information. For example, with user's location the backend servers are able to deduce the weather where the user is located. With such information, proper environmental relevant advertisements can be selected.
4) user preferences persistency, meaning users with terminal devices who share similar preferences on media contents should be assigned with advertisements with specific preference hints or information. For example, similar artworks can be promoted for users who are interested in the same kind of genre.

There are more forms of persistency besides the above list, and they could also be combined together to generate more specific and proper advertisement selections. In summary, the present invention takes advantage of the properties of computers, modern mobile devices and networks: high speed, automatic, huge capacity and persistent, and identifies media contents in very high efficiency, making it possible for content providers and ad agents to automatically, accurately and rapidly push relevant persistent advertisements to the terminal.

In other aspect, the present invention also provides a system and a set of methods with features and advantages corresponding to those discussed above.

All these and other introductions of the present invention will become much clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which.

Like reference numerals refer to like parts throughout the several views of the drawings.

DESCRIPTION OF THE PREFERRED EMBODIMENT

The present invention now will be described more fully hereinafter with reference to the accompanying drawings, in which some examples of the embodiments of the present inventions are shown. Indeed, these inventions may be embodied in many different forms and should not be construed as limited to the embodiments set forth herein; rather, these embodiments are provided by way of example so that this disclosure will satisfy applicable legal requirements. Like numbers refer to like elements throughout.

Figure 1:
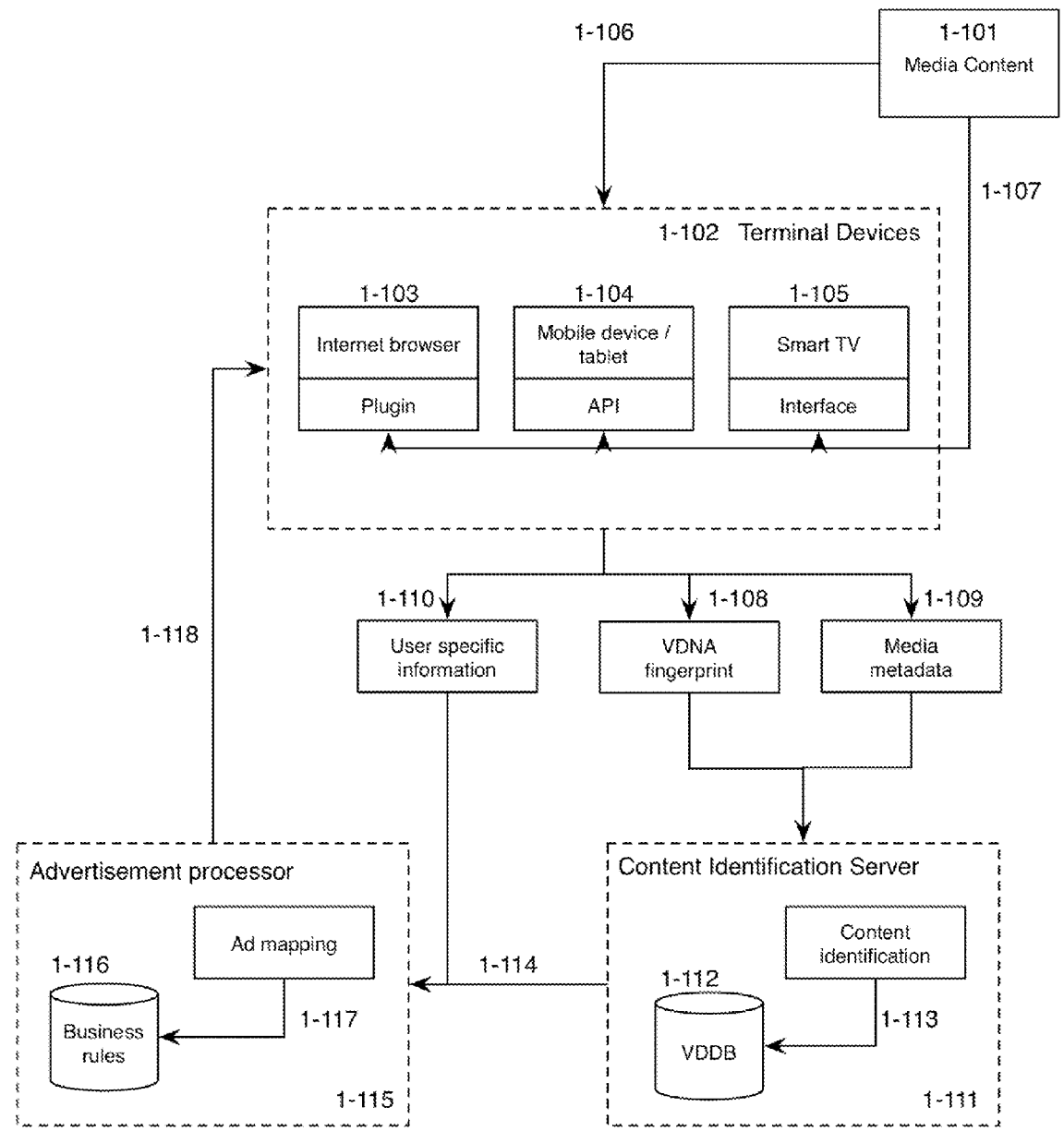
FIG. 1 shows schematically a component diagram of each functional entity in the system according to the present invention.

FIG. 1 illustrates main functional components of the persistent advertisement system, in which 1-101 represents the media contents that are playing on the terminals. The media contents can be videos, audios, or even images and texts, and they can be in any kind of formats. Component 1-102 represents the terminals and devices, which varies from internet browsers on PCs, or mobile devices and tablets, to smart TVs. The common features that these terminals and devices are supported in the persistent advertisement system are 1) able to play media contents, 2) able to install customizable software components, 3) network enabled. Therefore, the terminals supported in this part of the system can be internet browsers with plug-ins, mobile devices or tablets equipped with applications using dedicated APIs, or smart TVs with specific interfaces. The functionalities of the software components mentioned above include 1) extract VDNA fingerprints of the media content while its playing, 2) collect required content metadata, 3) collect user's specific information.

Actions 1-106 and 1-107 represent the interactions between terminals and the original media contents that are playing. These two actions are running in parallel and independently. 1-106 shows that the terminal is playing the media content on the user interface. This action reacts according to users' operations. Such as play, pause, stop, etc. The media player's components used for playing media contents are either dedicated applications or plug-in extensible since this software component is not only required for media content playback, but also acts as the core functional entity on the client's side. It performs all interactions between users, devices, clients and servers, among which action 1-106 represents interactions between users and the terminal devices.

1-107 is the action running on the background of the dedicated or plug-in media player component. In other words, it is invisible to the users and is another route besides action 1-106. The main tasks of action 1-107 are 1) extract VDNA fingerprints of the media contents, 2) collect required content metadata and user specific information, such as user's preferences on the media contents, user's location, terminal type and so on, 3) send these data for content identification and advertisement selection, 4) display selected advertisement on the terminal in forms of ad web pages, overlay banners, pre-roll/mid-roll/post-roll ad frames, and so on. All of the tasks above are performed in the software component as dedicated applications or plug-ins installed in the terminal devices.

In order to achieve the aforementioned tasks, the software component is required to design with permissions to access media contents as well as other user sensitive data, such as user's location, which will be obtained under user authentication. Also the software component is capable of persisting user preferences over media contents. For example, the genre, authors, albums or other related information about media contents, which the specific user is fond of. Such information can be collected by the dedicated software component installed in the terminal devices, and will be sent to the backend server after the user's authentication for analysis, so that the most suitable content-aware advertisements can be generated for specific users or persistent advertisements for a group of users sharing targeted interests.

1-108 represents VDNA fingerprints data extracted from the media contents by the dedicated software component installed on terminal devices. VDNA fingerprints are the essence of media content identification technology. It extracts the characteristic values of each frame of image or audio from media contents. This process is similar to collecting and recording human fingerprints. The fact that VDNA technology is entirely based on the media content itself means in between media content and generated VDNA is one-to-one mapping relationship. Compared to the conventional method of using digital watermark technology to identify video contents, VDNA technology does not require pre-process the video content to embed watermark information. Also, the VDNA extraction algorithm is greatly optimized to be efficient, fast and lightweight so that it consumes only an acceptable amount of CPU (central processing unit) or memory resources on the terminal devices. The VDNA extraction process is performed very efficiently on the terminal side. In addition, extracted fingerprints are very small in size compared to the media content, which allows transferring fingerprints over a network possible.

The VDNA extraction algorithm can be various. Take video content for example: the extraction algorithm can be as simple as the following a) sample the video or media frame as image b) dynamically divide the input image into variable amount of equal sized squares, c) compute average value of the RGB (red, green and blue) values from each pixel in each square, d) in this case the VDNA fingerprint of this image is the 2 dimensional vector of the values from all divided squares. The smaller a square is divided, the more accuracy the fingerprint can achieve. However, at the same time it will consume more storage. In a more complex version of the VDNA extraction algorithm, other factors such as brightness, alpha value of the image, image rotation, clipping or flipping of the screen, or even audio fingerprint values will be considered.

The software component on the terminal devices will also collects metadata from the media content, which is playing on it (step 1-109). The collected metadata can be obtained either locally from the media file such as title, author, album, etc, or collected online through media content websites, where a lot of information regarding the media content can be discovered. For example, audience comments, related media contents in the same genre, etc. The software component on the terminal devices will also send the collected metadata to the identification server along with the extracted VDNA fingerprints from 1-108, to help generate more accurate identification results.

The terminal prepares VDNA fingerprints of the media content and collects metadata of the media content such as title, author, duration, audience comments and so on. Such data will be sent to the content identification server (1-111), which performs content identification and matching (1-113) against the VDDB (1-112) server where master media contents are registered.

The content identification server accepts media content query requests which comes along with extracted VDNA fingerprints of the input media contents. The input media contents can be any format of audio, video or image contents. In this case it is processed by dedicated software components on the terminal devices, so that a set of VDNA fingerprints are extracted from the contents. Basically, the content identification server is composed by a set of index engines, a set of query engines and a set of master sample databases. All of these components are distributed and are capable to cooperate with each other.

The index engine or distributed index engines store a key-value mapping where the keys are hashed. VDNA fingerprints of the registered master media content and the values are the identifier of the registered master media content. When a query request is triggered, a set of VDNA fingerprints of the input media content is submitted. Then, a pre-defined number of VDNA fingerprints are sampled from the submitted data. The sampled fingerprints are each hashed using the same algorithm as those registered VDNA fingerprints previously hashed, using these hashed sampled fingerprints to get the values in the registered mapping. Based on statistical research on the matching rates of key frames between input media contents and master media contents, it can be concluded that by being given only a set of sampled fingerprints extracted from the input media content, it is in highly possible to get a list of candidate matched master content ranked by the hit rate of similarity. The output of index engine will be a list of identifiers of candidate media contents ranked by the hit rate of similarity with sampled fingerprints of input media content.

The query engine performs VDNA fingerprint level match between each one of VDNA fingerprints extracted from input media content and all of the VDNA fingerprints of every candidate media content output from index engine. There are also scalability requirements for the design of a query engine to be the same index engine, because the number of registered media contents by content owner may vary in different magnitude. As a result, the amount of registered VDNA fingerprints can be massive. In such a condition, distributed query engines are also required to enforce the computing capability of the system. The basic building block of VDNA fingerprint identification algorithm is a calculation and comparison of Hamming Distance of fingerprints between input and master media contents. A score will be given after comparing input media content with each one of the top ranked media contents outputted by the index server. A learning-capable mechanism will then help to decide whether or not the input media content is identified with a reference to the identification score, media metadata, and identification history.

The result of content identification will be sent together with user specific information (1-110) collected from the terminals to the advertisement processor (1-115) for ad selection. The content provides and the advertisement agents will predefine some business rules for the choice of advertisements. These rules are crucial for generating content-aware persistent advertisements. The terminology of content-aware persistent advertisement is self-explanatory, wherein content-aware means that the advertisement is selected according to the recognition result of the media content; which comes along from the content identification center. The advertisements are also persistent, wherein the persistency can have multiple forms, such as:

1) geo-location persistency, meaning that users with terminal devices in a same range of locations should be assigned with advertisements with specific location hints or information. For example, promotion of the nearest products which appear in the recognized media content.
2) time persistency, meaning users with terminal devices in the same duration of time should be assigned with advertisements with specific date or time hints or information, for example products on sale on a specific date of a week.
3) environment persistency, meaning users with terminal devices in the same environment should be assigned with advertisements with specific environmental hints or information, for example with user's location the backend servers are able to deduce the weather where the user is located, with such information proper environmental relevant advertisements can be selected.
4) user preferences persistency, meaning users with terminal devices who share similar preferences on media contents should be assigned with advertisements with specific preference hints or information, for example similar artworks can be promoted for users who are interested in the same kind of genre.

There are more forms of persistency besides the list above, and could also be combined together to generate more specific and proper advertisement selections.

The selected advertisements will then be sent back to the terminal (1-118), where the software components installed on it will display the advertisements in the form provided by the business rules, wherein the forms of advertisements can be static texts, image banners, or even interactive animations. The key to successful online advertising is to grab attention without being overly intrusive. Current popular methods of online advertising include:

1) banner advertisements: Banner ad online advertising is one of the first advertising methods used on the internet. Banner advertisements are also easy to create.
2) floating advertisements: This form of online advertising is seen as intrusive by some people. Floating ads appear to float or move across a user's screen usually while the media content is paused.
3) interstitial advertisements: This is a relatively new form of online advertising which has grown in popularity due to online media contents. Interstitial advertisements are like television commercials. They usually appear before media content loads or are placed in some other spot inside the media content.
4) pop-under advertising: This is one of the newest and most controversial forms of online advertising. Unlike pop-up ads, pop-under ads are sneakier and less intrusive. They don't steal the attention away from the media content as pop-up ads can do. Instead, a window will open up in the background with the ad in it and will be instantly minimized so that the user can continue to look at the original media content only to find the ad later. The attractiveness of pop-under advertising is due to its relatively cheap cost.

Advances in technology also mean advances in online advertising. More businesses have started taking advantage of Streaming Video when it comes to their online advertising.

Figure 2:
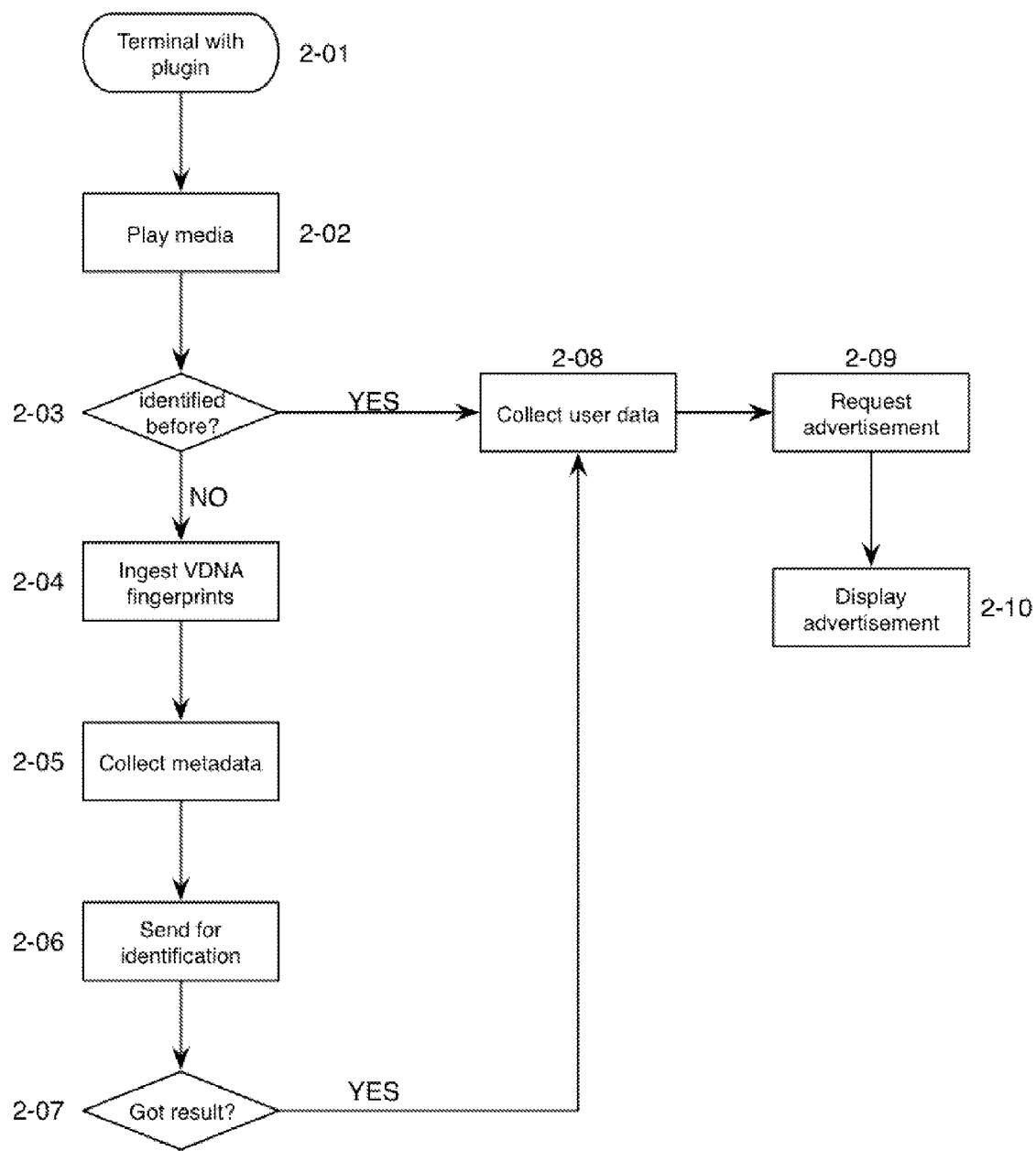
FIG. 2 is a flow chart showing a number of steps of content identification in the aspect of terminal side.

FIG. 2 illustrates the workflow of the persistent advertisement system on the terminal side. When the media is being played, the software component checks whether or not the media has been identified before (2-03). If the said media content has been identified before in this device or terminal, it has all the required genuine information about the media. Therefore, it can send the genuine information of the media along with some user authorized data such as user's preferences, user's location and terminal type, via internet or mobile networks such as GSM/CDMA (global service for mobile communications) or 3G (third generation) networks, to start a request to the advertisement selection processor for suitable advertisements (2-09).

When the selected advertisements are returned from advertisement selection server, the terminal then displays these advertisements according to some given or predefined business rules, which can be either ad webpages, overlay ad banners, pre-roll/mid-roll/post-roll ad frames and so on (2-10).

On the other hand, if the playing media content has not been identified before, the dedicated software component on the terminal will start a routine for content identification. The routine begins with extracting characteristic values from the media content, also known as VDNA fingerprints (2-04). The design of VDNA fingerprints is very compact, so that it is feasible to transfer over mobile networks. Because some terminals may use mobile networks and they always have lower bandwidth, sending huge amounts of information of the media content to the content provide for identification is not realistic, sending only metadata of the media content may not result in an accurate identification of the content. Therefore, extracting key characteristics of the media contents and sending the extracted fingerprints of the media contents remits the mentioned disadvantages. There are various levels of VDNA extraction algorithm. Take video content as an example, the extraction algorithm can be as simple as the following a) sample the video frame as image, b) dynamically divide the input image into certain variable amount of equal sized squares, c) compute average value of the RGB values from each pixel in each square, d) in this case the VDNA fingerprint of this image is the 2 dimensional vector of the values from all divided squares. The smaller a square is divided, the more accuracy the fingerprint can achieve, yet at the same time it will consume more storage. In more complex version of the VDNA extraction algorithm, other factors such as brightness, alpha value of the image, image rotation, clipping or flipping of the screen, or even audio fingerprint values will be considered.

The terminal also collects metadata of the media content at the same time, including title, author, and duration of the media content. Such metadata information can be helpful to setup some filtration criteria when performing VDNA fingerprints matching to shorten the processing time for identification. The collected metadata can be obtained either locally from the media file such as title, author, album, etc., or collected online through media content websites, where a lot of information regarding the media content can be discovered, for example audience comments, related media contents in the same genre, etc.

The VDNA fingerprints are also sent to the content identification server with the media metadata via internet or mobile networks such as GSM/CDMA or 3G networks. When the terminal receives the genuine information of the media content from the content identification server, it will send the genuine information of the media along with some user authorized data (such as the user's preferences, the user's location and terminal type) via internet or mobile networks such as GSM/CDMA or 3G networks, to start a request to the advertisement selection processor for suitable advertisements (2-09). When the selected advertisements are returned from the advertisement selection server, the terminal then displays these advertisements according to some given or predefined business rules, which can be either ad webpages, overlay ad banners, pre-roll/mid-roll/post-roll ad frames and so on (2-10).

Figure 3:
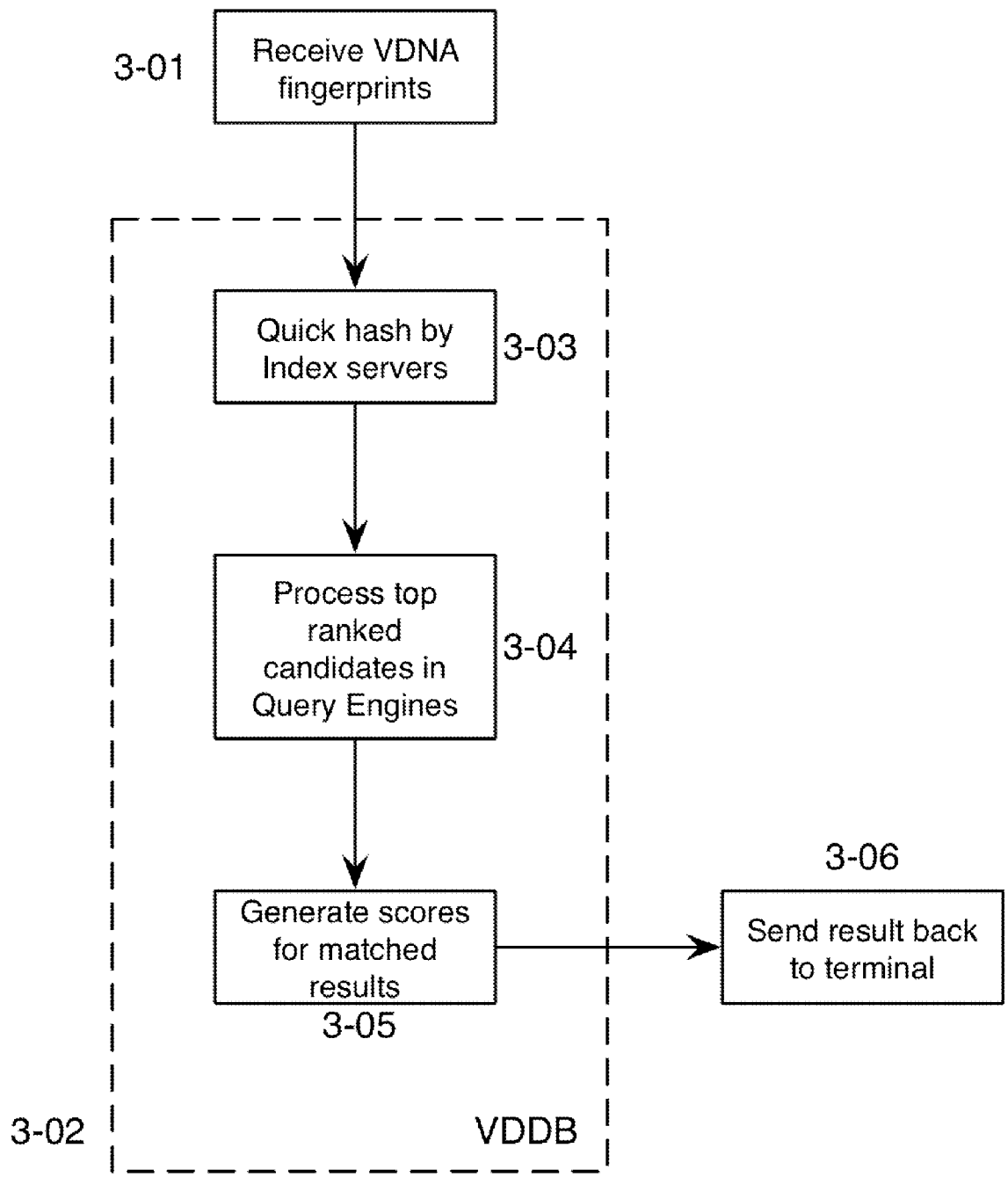
FIG. 3 is a flow chart showing a number of steps of content identification in the aspect of server side.

FIG. 3 illustrates the workflow of the content identification system. The core processing block of the content identification system is VDDB (3-02). After receiving the VDNA fingerprints and media content metadata from the terminal, VDDB starts a quick hash process over the sample VDNA fingerprints with index servers (3-03). The index engine, or distributed index engines, stores a key-value mapping where the keys are hashed VDNA fingerprints of the registered master media content and the values are the identifier of the registered master media content. When a query request is triggered, a set of VDNA fingerprints of the input media content is submitted. Then, a pre-defined number of VDNA fingerprints are sampled from the submitted data. The sampled fingerprints are each hashed using the same algorithm as the registered VDNA fingerprints were previously. Using these hashed sampled fingerprints, you can get the values in the registered mapping. Based on the statistical research on the matching rates of key frames between input media contents and master media contents, it can be concluded that by being given only one set of sampled fingerprints extracted from the input media content, it is in highly possible to get a list of candidate matched master content ranked by the hit rate of similarity if all master media contents are fingerprinted and indexed beforehand. This is the optimization idea behind index servers. Using the index server to pre-process the input media content can save large amounts of processing efforts by avoiding having to thoroughly compare all master media contents in detail by quickly generating the best matched media candidate list.

Component 3-04 is the process inside the query engine which performs the VDNA fingerprint level match between each of the VDNA fingerprints extracted from input media content. All VDNA fingerprints of every candidate media content output from the index engine. There are also scalability requirements for the design of the query engine the same index engine. This is because the number of registered media contents by content owner may vary in different magnitudes, and as a result the amount of the registered VDNA fingerprints can be massive. In such a condition, distributed query engines are also required to enforce computing capability of the system.

The basic building block of the VDNA fingerprint identification algorithm is the calculation and comparison of the Hamming Distance of fingerprints between the input and master media contents. A score will be given after comparing the input media content with each one of top ranked media contents outputted by the index server (3-05). A learning-capable mechanism will then help to decide whether or not the input media content is identified with reference to the identification score, media metadata, and identification history. Finally, the result will then be sent back to the terminal over the same network.

Figure 4:
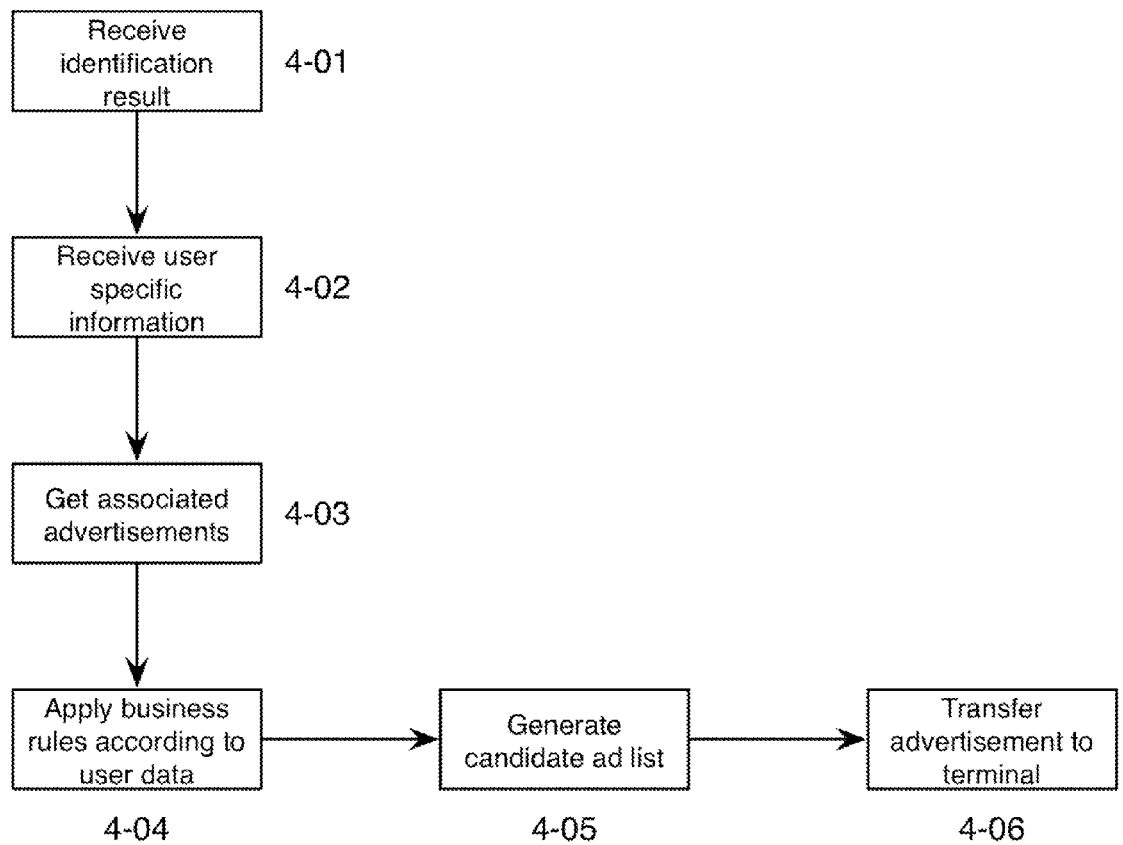
FIG. 4 is a flow chart showing a number of steps of how the associated advertisements are selected.

FIG. 4 illustrates the workflow of the selection of persistent advertisements in the advertisement processor. The process will receive the results of the content identification and the user's specific information from terminals (4-01 and 4-02). In the case that the terminals are playing the same media contents, the identification results should be identical, so that when the advertisement process is trying to get associated advertisements according to the identification result, the same set of advertisements are selected for all those terminals. Therefore, it is able to achieve the persistency of advertisements across multiple terminals and devices, in the sense that the advertisements chosen are content-aware from the user's aspect. The acquirement of associated advertisements (4-03) is based on the mapping of a database defined by content providers and advertisement agents, who setup sets of mapping criteria and business rules. These rules regard what advertisements should be pushed for, what kind of media contents and in what form the chosen advertisements should be displayed. The business rules which decide the display form of the chosen advertisements can include 1) to display a standalone advertisement or a set of alternative advertisements, 2) to display the advertisement as embedded in the webpage playing the media content or a separate webpage, 3) to display the advertisements as static texts, images or animation, 4) the size and dimensions of the advertisements to display, 5) the points of time to display the advertisements while playing the media content can be pre-roll/mid-roll/post-roll advertisement frames. Besides those mentioned above, many more business rules customized by content providers and advertisement agents can be implemented.

The advertisement processor mainly applies these business rules according to the user specific information acquired by terminals, where users have the choices to choose what kind of information to share with the advertisement processor in order to generate more accurate and specific advertisements. The options users can be choose to share include 1) the user's preferences which can be predefined by the application or the content provider according to the need of advertisements or product promotions, 2) the user's location information, users can also choose to share the precision of the current location, 3) the user's terminal type, which allows advertisement processor to choose proper advertisements for the terminals or devices playing the media content, and so on.

Finally, the proper list of advertisements are generated and transferred back to the terminals for display.

Figure 5:
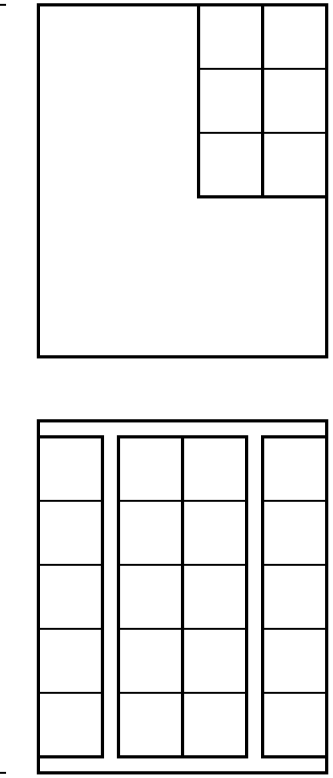
FIG. 5 is about the comparison of fingerprint extraction between the present invention and the U.S. Pat. No. 8,009, 861.
Figure 5:
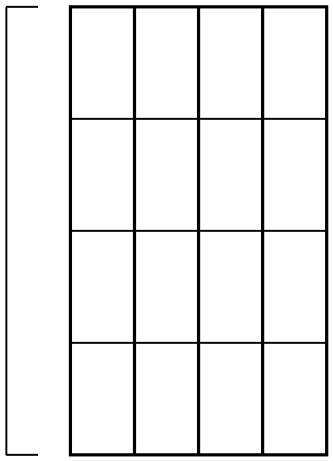

FIG. 5 is described at the end of the present invention within the section of comparison of fingerprint extraction between the present invention and the U.S. Pat. No. 8,009,861.

To further understand the details of the present invention, the definitions of some processing are necessary which are as follows:

Extract/Generate: to obtain and collect characteristics or fingerprints of media contents via several extraction algorithms.

Register/Ingest: to register those extracted fingerprints together with extra information of the media content into the database where fingerprints of master media contents are stored and indexed.

Query/Match/Identify: to identify requested fingerprints of media content by matching from all registered fingerprints of master contents stored in the database, via advanced and optimized fingerprint matching algorithm.

In summary, system and method for providing content-aware persistent advertisements comprise:

A method for providing content-aware persistent advertisements comprises the following steps:
  a) extracting and collecting VDNA (Video DNA) fingerprints of media contents playing on various network-enabled terminals including Internet browsers, mobile devices, tablets, smart TVs (television) and so on, and
  b) sending the aforementioned extracted fingerprints along with other information such as metadata, user's location, etc to a content identification server via Internet or mobile networks.

The aforementioned content-aware means matching and identification of the aforementioned media content by content itself instead of metadata information such as title, author, etc.

The aforementioned persistent advertisement refers to that when the same media content is playing on multiple terminals, it can be identified and relevant advertisements can be pushed to the aforementioned terminal according to identification result.

The aforementioned persistent advertisement refers to media content related advertisements pushed to the aforementioned terminal according to the aforementioned identification result, and those chosen advertisements are mostly similar, but can carry some user specific information such as user's location, terminal type or preferences and so on.

The aforementioned media contents can be videos, images, audio, text and any other media type.

The aforementioned extracting and collecting VDNA fingerprints is performed on the aforementioned terminals where the aforementioned media contents are playing.

The aforementioned terminals supported are network-enabled smart devices including PCs (personal computers) running Internet browsers, or dedicated media players, smart mobile devices and tablets, and smart TVs (televisions) and so on.

The aforementioned information sent to the aforementioned content identification server along with the aforementioned content fingerprints are not mandatory, and users have options to decide what information to share.

The aforementioned extracted fingerprints and other information are sent via Internet or mobile networks to the aforementioned content identification server.

A method for providing content-aware persistent advertisements comprises the following steps:
  a) extracting and collecting VDNA (Video DNA) fingerprints of media contents playing on various network-enabled terminals including Internet browsers, mobile devices, tablets, smart TVs (televisions) and so on,
  b) sending the aforementioned extracted fingerprints along with other information such as metadata, user's location, etc to content identification server via Internet or mobile networks,
  c) selecting accurate advertisements according to the aforementioned media content and relevant information, and
  d) finally pushing the aforementioned advertisements back to user's terminal.

The aforementioned content fingerprints are identified in the aforementioned content identification server using the aforementioned VDNA identification technology, and the result of the aforementioned identification is considered to be accurate.

The aforementioned VDNA can be extracted from any valid format of the aforementioned media content, and the aforementioned media content identification heavily relies on the accuracy and swiftness of the aforementioned VDNA technology.

The aforementioned advertisements are selected according to the combination of the aforementioned identification of the aforementioned media content and other information from users, along with some business rules given by content provider.

The aforementioned advertisements are pushed to the aforementioned terminals while the aforementioned content is playing.

A system for providing content-aware persistent advertisements comprises the following sub-systems:
  a) Sub-system extracting and collecting VDNA (Video DNA) fingerprints of media contents playing on various network-enabled terminals including Internet browsers, mobile devices, tablets, smart TVs (televisions) and so on, b) Sub-system sending the aforementioned extracted fingerprints along with other information such as metadata, user's location, etc to content identification server via Internet or mobile networks, c) Sub-system selecting accurate advertisements according to the aforementioned media content and relevant information, and d) Sub-system pushing the aforementioned advertisements back to user's terminal.

The aforementioned terminals supported are network-enabled smart devices including PCs (personal computers) running Internet browsers, or dedicated media players, smart mobile devices, tablets, and smart TVs (televisions) and so on.

The aforementioned terminals supported are equipped with dedicated components such as plugins for Internet browsers, APIs (Application Program Interfaces) for mobile devices and interfaces for the aforementioned smart TVs to perform content fingerprint extraction, data collection and transmission.

The aforementioned network can be used to carry data between the aforementioned terminals and content providers.

The aforementioned advertisements are mainly selected according to result of content identification, and administrator can associate different the aforementioned advertisements to the same content but push to different terminal devices according to other information provided together by the aforementioned devices.

The method and system of the present invention are based on the proprietary architecture of the aforementioned VDNA® and VDDB® platforms, developed by Vobile, Inc, Santa Clara, Calif.

DIFFERENT FROM U.S. Pat. No. 8,009,861, PUBLICATION NO. 2007-0253594 BY LU, ET AL

The VDNA fingerprint extraction in the present invention is unique and totally different from the prior art by U.S. Pat. No. 8,009,861, PUBLICATION NO. 2007-0253594 by LU, et al (hereafter called LU_594).

COUNT 1: The prior art LU_594 is totally different from the dynamic VDNA fingerprint extraction in the present invention because:

In Prior Art LU_594:
"a frame is divided evenly into 4×4 or 2×2 blocks of equal size. But each block does not have to be "square". Hence, the number of blocks and location of blocks are fixed, so it is impossible to adjust the block density according to the variation of different video frame's content characteristics. Therefore, it is a static method (see FIG. 5(a)).

In the present invention and its parent application:
"dividing an input image into certain amount of equally sized squares" which means that the input image is dynamically divided into variable amount of equally sized squares.

For example and for explanation:
for rich image, it relates to large amount of equally sized squares;
for simple image, it relates to small amount of equally sized squares.

Hence, the number of squares and location of squares can be dynamically adjusted to adapt to the variation of different video image's content characteristics (see FIGS. 5(b) and (c)).

Furthermore, the aforementioned dynamic VDNA fingerprint extraction can be time-based (between frames) or space-based (within frame content itself), and so different VDNA fingerprints are extracted for master frames and sample frames.

The VDNA fingerprint extraction of the sample frame is dynamic and the extracted VDNA fingerprint in the first matching is the most accurate one which is used to quickly determine the original frame, namely, the "sync (synchronization)" success. In contrast, the extracted VDNA fingerprint during the video playing is of low accuracy which is used to trace the "sync" status. In other words, the high accurate VDNA fingerprint is used to match and search original frame "sync" while the low accurate VDNA fingerprint is used to trace "sync lock". The former requires large amount of data and computing while the later requires less data and computing.

Once the "sync" is locked, the VDNA fingerprint of sample frame will automatically switch to low accurate mode to save bandwidth and computing resources.

But, if the matching performance is too low which is called "out of sync", it can immediately increase the VDNA fingerprint accuracy which adaptively executes the "re-sync" process with the high accurate VDNA fingerprint extraction.

Therefore, the aforementioned VDNA fingerprint is used to synchronize with the media contents or media frames including master frames and sample frames.

To further reduce data bandwidth and computing consumption, the low accurate VDNA fingerprint utilizes time segmentation and multiple-frame overlapping.

COUNT 2: the processing is different between LU_594 and the present invention.

In Prior Art LU_594:
"B.sub.i is the mean pixel value of the i-th block"; "Compare and rank the value of B.sub.i among the blocks and assign the ordinal rank to each block" and "Compare and rank the value of D.sub.i among the frames in the group and assign the ordinal rank to each frame".

Here, the original value in each block has been lost after "compare and rank" processing.

After "compare and rank" processing, it can save storage space and simplify computing, but lose match quality.

In the present invention and its parent application:
"compute average value of the RGB values from each pixel in each square" and "VDNA fingerprint of this image is the 2 dimensional vector of the values from all divided squares".

Here, without any "compare and rank" processing, it greatly increases the match quality based on original values from each pixel in each square.

Therefore, the processing and process are totally different between prior art LU_594 and the present/parent application.

COUNT 3:
Prior art LU_594 is limited to "fingerprinting video", but the present invention is limited to "extracting fingerprint from input media content" wherein said media content can be video, image or audio, etc.

In conclusion, the prior art LU_594 is totally different and completely unrelated to the present and its parent applications.

COUNT 4:
The present invention is focused on the following features which are not covered in the prior art LU_594:

a) Extracting and collecting VDNA fingerprints of media contents playing on various network-enabled terminals including Internet browsers, mobile devices, tablets, smart TVs (television) and so on.

b) Extracted fingerprints are very small in size compared to the media content, which allows transferring fingerprints over a network possible and the design of VDNA fingerprints is very compact, so that it is feasible to transfer over mobile networks.
c) Extracting VDNA fingerprints of the media content while it's playing and these two actions are running in parallel and independently.
d) There are various levels of VDNA extraction algorithm. In more complex version of the VDNA extraction algorithm, other factors such as brightness, alpha value of the image, image rotation, clipping or flipping of the screen, or even audio fingerprint values will be considered.

The method and system of the present invention are not meant to be limited to the aforementioned experiment, and the subsequent specific description utilization and explanation of certain characteristics previously recited as being characteristics of this experiment are not intended to be limited to such techniques.

Many modifications and other embodiments of the present invention set forth herein will come to mind to one ordinary skilled in the art to which the present invention pertains having the benefit of the teachings presented in the foregoing descriptions. Therefore, it is to be understood that the present invention is not to be limited to the specific examples of the embodiments disclosed and that modifications, variations, changes and other embodiments are intended to be included within the scope of the appended claims. Although specific terms are employed herein, they are used in a generic and descriptive sense only and not for purposes of limitation.

What is claimed:

1. A method for providing content-aware persistent advertisements including persistency of geo-location, time, environment and user preferences, based on identified contents by dynamic VDNA (Video DNA) fingerprint extraction, said method comprising:
   a) extracting and collecting VDNA fingerprints of media contents playing on various network-enabled terminals including Internet browsers, mobile devices, tablets, smart TVs (television),
   b) sending said extracted VDNA fingerprints along with other information including metadata and user's location to a content identification server via Internet or mobile networks, and
   c) selecting accurate advertisements according to said media contents identified by said VDNA fingerprints, and pushing said content-aware persistent advertisements back to said terminals,
wherein said dynamic VDNA fingerprint extraction comprises:
   a) sampling a media frame as an image,
   b) dynamically dividing an input image into certain variable amount of equally sized squares,
   c) computing average value of RGB (Red, Green and Blue) values from each pixel in each said square,
   d) said VDNA fingerprint of said image being a two dimensional vector of the values from all divided squares, and
   e) said VDNA fingerprint is used to synchronize with said media frame including master frame and sample frame,
wherein
   a) rich image relates to large amount of said equally sized squares, and simple image relates to small amount of said equally sized squares,
   b) the number of said squares and location of said squares is dynamically adjusted to adapt to the variation of different video image's content characteristics,
   c) said dynamic VDNA fingerprint extraction is time-based (between frames) or space-based (within frame content itself), and so different said VDNA fingerprints are extracted for master frames and sample frames,
   d) said VDNA fingerprint extraction of said sample frame is dynamic and said extracted VDNA fingerprint in the first matching is the most accurate one which is used to quickly determine original frame, namely, "sync (synchronization)" success, wherein in contrast, said extracted VDNA fingerprint during video playing is of low accuracy which is used to trace said "sync" status which in other words, the high accurate said VDNA fingerprint is used to match and search said original frame "sync" while the low accurate said VDNA fingerprint is used to trace "sync lock", and the former requires large amount of data and computing while the later requires less data and computing,
   e) once said "sync" is locked, said VDNA fingerprint of said sample frame will automatically switch to low accurate mode to save bandwidth and computing resources,
   f) if matching performance is too low which is called "out of sync", it immediately increases VDNA fingerprint accuracy which adaptively executes "re-sync" process with the high accurate said VDNA fingerprint extraction, and
   g) to further reduce data bandwidth and computing consumption, the low accurate said VDNA fingerprint utilizes time segmentation and multiple-frame overlapping.

2. The method as recited in claim 1, wherein said content-aware means matching and identifying of said media content by content itself instead of metadata information including title and author.

3. The method as recited in claim 1, wherein said content-aware persistent advertisement refers to that when targeted media content is playing on multiple terminals, it can be identified and relevant advertisements can be pushed to said terminal according to identification result.

4. The method as recited in claim 1, wherein said content-aware persistent advertisement refers to media content related advertisements pushed to said terminal according to said identification result, and those chosen advertisements are mostly similar, but can carry some user specific information including user's location, terminal type or preferences.

5. The method as recited in claim 1, wherein said media contents can be videos, images, audio, text and any other media type.

6. The method as recited in claim 1, wherein said extracting and collecting said VDNA fingerprints is performed on said terminals where said media contents are playing.

7. The method as recited in claim 1, wherein said terminals supported are network-enabled smart devices including PCs (personal computers) running Internet browsers, or dedicated media players, smart mobile devices and tablets, and smart TVs (televisions).

8. The method as recited in claim 1, wherein said information sent to said content identification server along with said content VDNA fingerprints are not mandatory, and users have options to decide what information to share.

9. The method as recited in claim 1, wherein said extracted VDNA fingerprints and other information are sent via Internet or mobile networks to said content identification server.

10. A method for providing content-aware persistent advertisements including persistency of geo-location, time, environment and user preferences, based on identified contents by dynamic VDNA (Video DNA) fingerprint extraction, said method comprising:
   a) extracting and collecting VDNA fingerprints of media contents playing on various network-enabled terminals including Internet browsers, mobile devices, tablets, and smart TVs (televisions), b) sending said extracted VDNA fingerprints along with other information including metadata and user's location to content identification server via Internet or mobile networks, c) selecting accurate advertisements according to said media content and relevant information, and d) finally pushing said content-aware persistent advertisements back to user's terminal, wherein said dynamic VDNA fingerprint extraction comprises:

a) sampling a media frame as an image, b) dynamically dividing an input image into certain variable amount of equally sized squares, c) computing average value of RGB (Red, Green and Blue) values from each pixel in each said square, d) said VDNA fingerprint of said image being a two dimensional vector of the values from all divided squares, and e) said VDNA fingerprint is used to synchronize with said media frame including master frame and sample frame, wherein a) rich image relates to large amount of said equally sized squares, and simple image relates to small amount of said equally sized squares, b) the number of said squares and location of said squares is dynamically adjusted to adapt to the variation of different video image's content characteristics, c) said dynamic VDNA fingerprint extraction is time-based (between frames) or space-based (within frame content itself), and so different said VDNA fingerprints are extracted for master frames and sample frames, d) said VDNA fingerprint extraction of said sample frame is dynamic and said extracted VDNA fingerprint in the first matching is the most accurate one which is used to quickly determine original frame, namely, "sync (synchronization)" success, wherein in contrast, said extracted VDNA fingerprint during video playing is of low accuracy which is used to trace said "sync" status which in other words, the high accurate said VDNA fingerprint is used to match and search said original frame "sync" while the low accurate said VDNA fingerprint is used to trace "sync lock", and the former requires large amount of data and computing while the later requires less data and computing, e) once said "sync" is locked, said VDNA fingerprint of said sample frame will automatically switch to low accurate mode to save bandwidth and computing resources, f) if matching performance is too low which is called "out of sync", it immediately increases VDNA fingerprint accuracy which adaptively executes "re-sync" process with the high accurate said VDNA fingerprint extraction, and g) to further reduce data bandwidth and computing consumption, the low accurate said VDNA fingerprint utilizes time segmentation and multiple-frame overlapping.

11. The method as recited in claim 10, wherein said content VDNA fingerprints are identified in said content identification server using said VDNA identification technology, and the result of said identification is considered to be accurate.

12. The method as recited in claim 10, wherein said VDNA fingerprints can be extracted from any valid format of said media content, and said media content identification heavily relies on the accuracy and swiftness of said VDNA technology.

13. The method as recited in claim 10, wherein said content-aware persistent advertisements are selected according to the combination of said identification of said media content and other information from users or by content provider.

14. The method as recited in claim 10, wherein said content-aware persistent advertisements are pushed to said terminals while said content is playing.

15. A system for providing content-aware persistent advertisements including persistency of geo-location, time, environment and user preferences, based on identified contents by dynamic VDNA (Video DNA) fingerprint extraction, said system comprising:

a) Sub-system extracting and collecting VDNA fingerprints of media contents playing on various network-enabled terminals including Internet browsers, mobile devices, tablets and smart TVs (televisions), b) Sub-system sending said extracted VDNA fingerprints along with other information including metadata and user's location to content identification server via Internet or mobile networks, c) Sub-system selecting accurate advertisements according to said media content and relevant information, and d) Sub-system pushing said content-aware persistent advertisements back to user's terminal, wherein said dynamic VDNA fingerprint extraction comprises:

a) sampling a media frame as an image, b) dynamically dividing an input image into certain variable amount of equally sized squares, c) computing average value of RGB (Red, Green and Blue) values from each pixel in each said square, d) said VDNA fingerprint of said image being a two dimensional vector of the values from all divided squares, and e) said VDNA fingerprint is used to synchronize with said media frame including master frame and sample frame, wherein a) rich image relates to large amount of said equally sized squares, and simple image relates to small amount of said equally sized squares, b) the number of said squares and location of said squares is dynamically adjusted to adapt to the variation of different video image's content characteristics, c) said dynamic VDNA fingerprint extraction is time-based (between frames) or space-based (within frame content itself), and so different said VDNA fingerprints are extracted for master frames and sample frames, d) said VDNA fingerprint extraction of said sample frame is dynamic and said extracted VDNA fingerprint in the first matching is the most accurate one which is used to quickly determine original frame, namely, "sync (synchronization)" success, wherein in contrast, said extracted VDNA fingerprint during video playing is of low accuracy which is used to trace said "sync" status which in other words, the high accurate said VDNA fingerprint is used to match and search said original frame "sync" while the low accurate said VDNA fingerprint is used to trace "sync lock", and the former requires large amount of data and computing while the later requires less data and computing, e) once said "sync" is locked, said VDNA fingerprint of said sample frame will automatically switch to low accurate mode to save bandwidth and computing resources, f) if matching performance is too low which is called "out of sync", it immediately increases VDNA fingerprint accuracy which adaptively executes "re-sync" process with the high accurate said VDNA fingerprint extraction, and g) to further reduce data bandwidth and computing consumption, the low accurate said VDNA fingerprint utilizes time segmentation and multiple-frame overlapping.

16. The system as recited in claim 15, wherein said terminals supported are network-enabled smart devices including PCs (personal computers) running Internet browsers, or dedicated media players, smart mobile devices, tablets, and smart TVs (televisions).

17. The system as recited in claim 15, wherein said terminals supported are equipped with dedicated components including plugins for Internet browsers, APIs (Application Program Interfaces) for mobile devices and interfaces for said smart TVs to perform content VDNA fingerprint extraction, data collection and transmission.

18. The system as recited in claim 15, wherein said network can be used to carry data between said terminals and content providers.

19. The system as recited in claim 15, wherein said content-aware persistent advertisements are mainly selected according to result of content identification, and administrator can associate different said content-aware persistent advertisements to the same content but push to different terminal devices according to other information provided together by said devices.

* * * * *